May 15, 1923.
A. HEUCKENDORFF
PEA HULLING MACHINE
Filed May 24, 1920
1,455,202
3 Sheets-Sheet 1
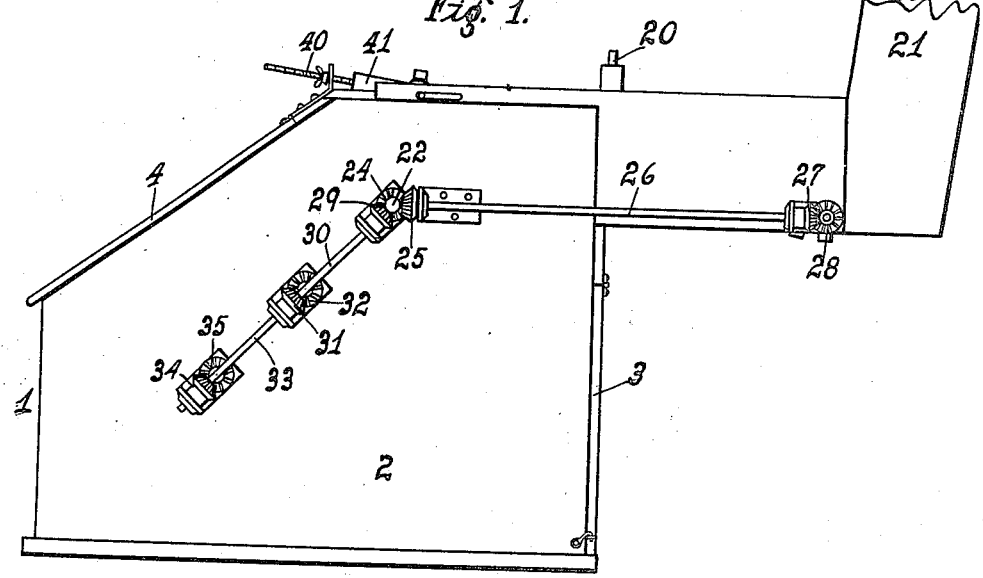
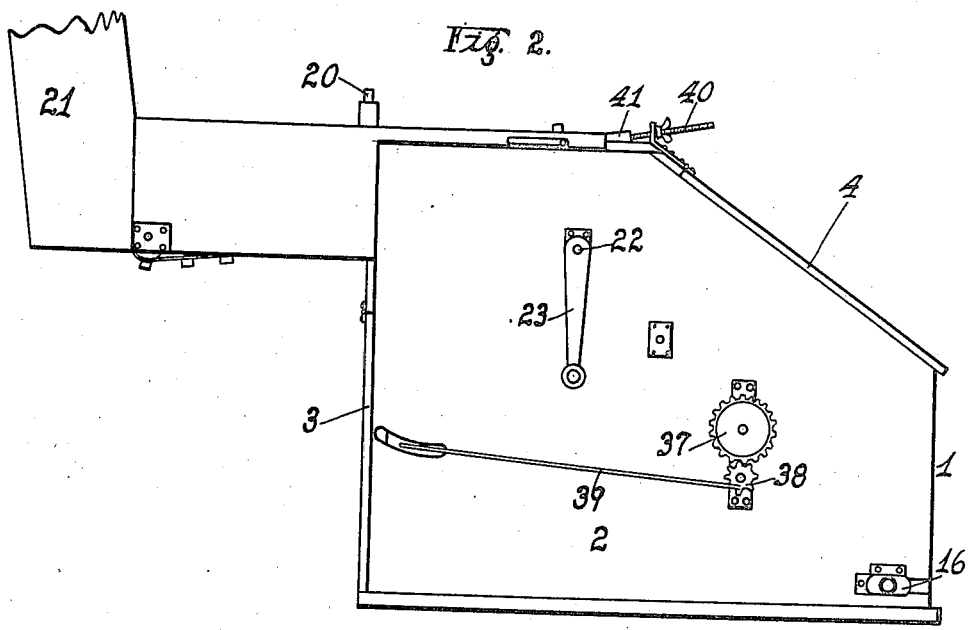
Inventor
Arnold Heuckendorff.
By Harry C. Schroeder
Attorney May 15, 1923.

A. HEUCKENDORFF

PEA HULLING MACHINE

Filed May 24, 1920

Inventor
Arnold Heuckendorff.

By Harry C. Schroeder
Attorney

May 15, 1923.
A. HEUCKENDORFF
1,455,202
PEA HULLING MACHINE
Filed May 24, 1920
3 Sheets-Sheet 3
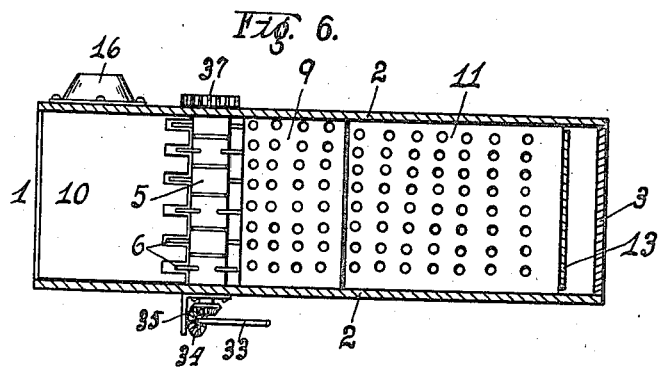
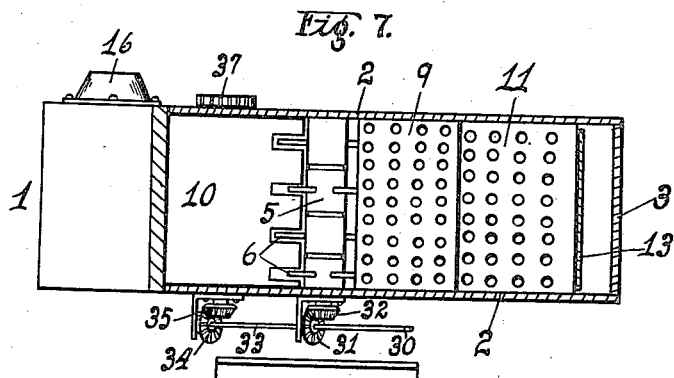
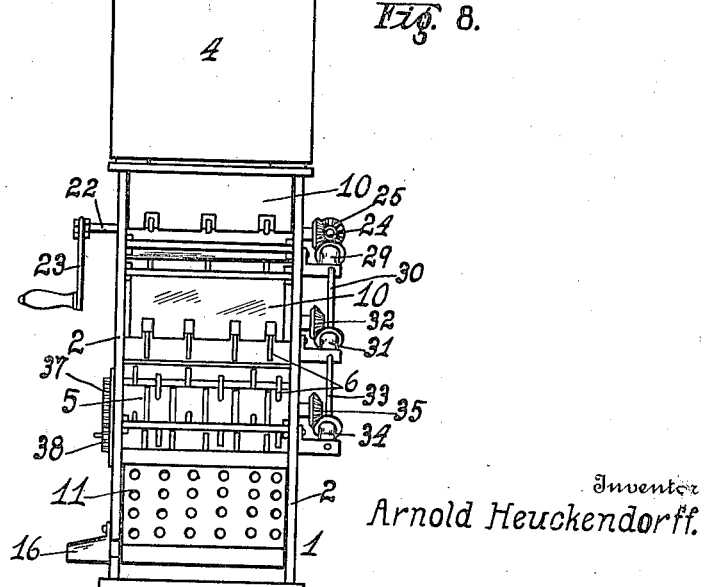
Inventor
Arnold Heuckendorff.
By Harry C. Schroeder
Attorney Patented May 15, 1923.

1,455,202

UNITED STATES PATENT OFFICE.

ARNOLD HEUCKENDORFF, OF OAKLAND, CALIFORNIA.

PEA-HULLING MACHINE.

Application filed May 24, 1920. Serial No. 383,745.

*To all whom it may concern:*

Be it known that I, ARNOLD HEUCKENDORFF, a citizen of the United States, residing at Oakland, in the county of Alameda and State of California, have invented certain new and useful Improvements in Pea-Hulling Machines, of which the following is a specification.

This invention relates to improvements in pea shelling machines, the principal object being to provide a device for the purpose which will effectually shell all the pods and will not crush the peas removed from the pods and will leave the pods clean, contrary to the condition of the pods and peas when put through the machines at present on the market for this purpose.

This is accomplished by means of a series of graduated drums, around which all the pods must pass, but having cooperating means so arranged that the peas are removed from the plane of the drums as soon as they are shelled, and so are not acted on by any remaining drums once they are shelled, thus preventing the shelled peas from being crushed.

The particular construction employed is set forth more fully hereinafter, the description being taken in connection with the accompanying drawings, to which reference is made, and in which:

Figure 1 is a side view of the sheller.

Figure 2 is a view of the opposite side from that shown in Fig. 1.

Figure 6 is a sectional view taken on the line 6—6 of Figure 3.

Figure 7 is a sectional view taken on the line 7—7 of Figure 3.

Figure 8 is a front view of the sheller with the cover raised.

Figure 3:
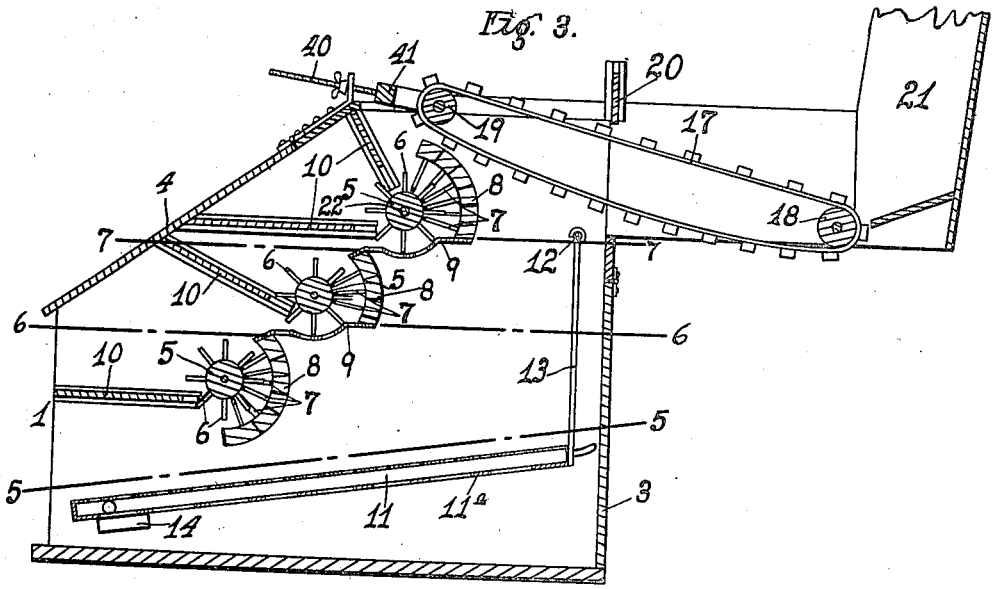
Figure 3 is a vertical sectional view of the pea sheller.
Figure 4:
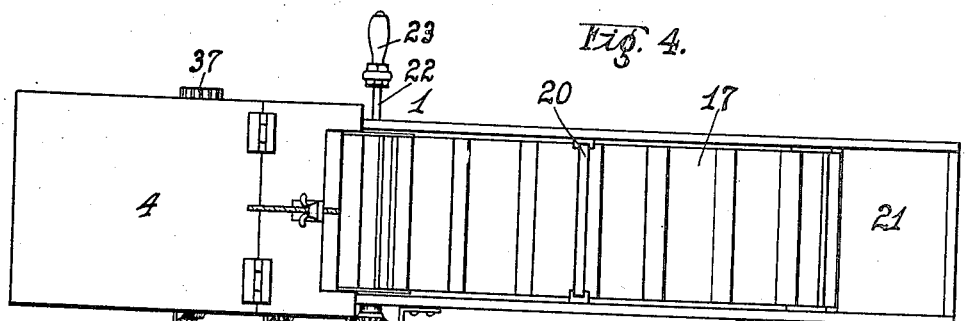
Figure 4 is a top plan view of my invention.
Figure 5:
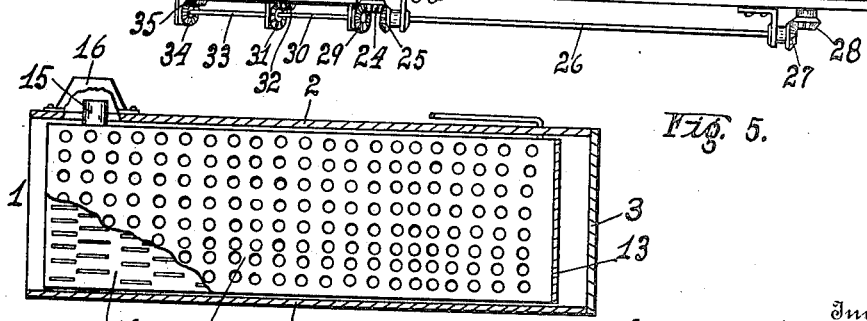
Figure 5 is a sectional view taken on the line 5—5 of Figure 3.

Referring more particularly to the drawings, the numeral 1 indicates an appropriate casing having side walls 2, a rear door 3 and a front door 4. Journaled in the side walls 2, are three graduated drums 5, each succeeding drum being below and in front of the preceding drum. On each drum are radiating fingers 6, said fingers being placed closer together transversely on each succeeding drum. Stationary fingers 7 project from walls 8 to the rear of the drums 5. The stationary fingers 7 are positioned between the rotating fingers 6 so that the pod is held between them and cut or broken open which allows the peas to drop out. Below the first two drums are placed screens 9 which allow the peas to drop through while the pods are retained and pushed forward into the next drum. Scraper plates 10 are set in front of each drum to take any pieces of pod that may adhere to the fingers 6, and prevent the same being carried around again. A sieve 11 below the drums 5 is hinged at 12 to a plate 13, the forward end resting on a block 14. Under the sieve 11 and movable therewith is a plate 11$^a$, the peas passing through the sieve onto the plate and being then delivered to a spout 15 opening into a mouth 16 to receive the peas from the plate. A feeding draper 17 travels over rollers 18 and 19 and a gate 20 midway of the draper regulates the number of peas fed to the machine, the draper 17 taking the peas as they are fed down a chute 21.

On a shaft 22, on which the topmost drum 5 is mounted, is secured an operating crank 23, on the other end of which shaft is a gear 24. Meshing with the gear 24 is a gear 25 on a shaft 26, on the other end of which is a gear 27 meshing with a gear 28 on the draper roller 18. A gear 29 meshes with the gear 24, to drive a shaft 30, on the other end of which shaft is a gear 31, meshing with a gear 32 connected to the second drum 5. To a shaft 33 to which the gear 31 is secured, is secured a second gear 34 meshing with a gear 35 to drive the third drum 5. On the opposite end of the third drum 5 is a spur gear 37 meshing with a pinion 38 to which an arm 39 is secured. The arm 39 is secured to the sieve 11 and causes it to oscillate by reason of the rotation of the gear 38. A tightening screw 40 is secured to a U-shaped yoke 41 secured to the bearings of the roller 19, by means of which the draper 17 may be tightened.

The operation of my invention is as follows:

Green peas in the pod are fed into the chute 21 and are carried forward by the draper 17, the gate 20 regulating the number of peas passing into the drums so that they enter one at a time. The pods pass through the first drum, are engaged by the fingers 6 and 7 as previously described, and the peas that are shelled drop through the screen 9 onto the screen 11. The pods that have not been opened are then pushed forward into the next drum where more of the peas are released and finally the third drum removes the last of the peas and the hulls fall onto the sieve 11 and out of the front of the casing 1. The shelled peas pass out of the spout 15 into a proper receptacle.

Having thus described my invention, what I claim as new and useful is:

1. A pea sheller comprising a plurality of rotating drums arranged in spaced alignment, the topmost of said drums being arranged to first receive the pods thereon and to pass them to the succeeding drums, fingers on the drums, stationary fingers cooperating with the drum-fingers to break open the pods passing in the plane of the fingers with the rotation of the drums, a stationary screen under each drum adapted to receive the peas therethrough but to retain the pods, the drums being so positioned that each screen will clear the drum below, a slanting sieve under all the screens adapted to receive all the peas thereon and the empty pods from the lowermost drum, a plate below the sieve, the peas dropping through the latter but the pods being retained thereon, a discharge from the sieve for the pods, and a discharge outlet from the plate for the peas.

2. A pea sheller comprising a plurality of rotating drums arranged in spaced alignment, the topmost of said drums being arranged to first receive the pods thereon and to pass them to the succeeding drums, fingers on the drums, stationary fingers cooperating with the drum-fingers to break open the pods passing in the plane of the fingers with the rotation of the drums, a screen under each drum adapted to receive the peas therethrough but to retain the pods, the drums being so positioned that each screen will clear the drum below, a slanting sieve under all the screens adapted to receive all the peas thereon and the empty pods from the lowermost drum, and means for oscillating the last mentioned sieve with the rotation of the drums, the peas being adapted to be separated from the pods with such oscillation.

3. A pea sheller comprising a plurality of rotating drums arranged in spaced alignment, the topmost of said drums being arranged to first receive the pods thereon and to pass them to the succeeding drums, fingers on the drums, stationary fingers cooperating with the drum-fingers to break open the pods passing in the plane of the fingers with the rotation of the drums, stationary means whereby the peas so shelled will be immediately withdrawn from the plane of the drums, and means whereby all the pods will be passed onto the succeeding drums.

4. A pea sheller comprising a plurality of rotating drums arranged to receive the peas successively, fingers on each drum, stationary fingers between which pass the fingers on said drums, the fingers on each succeeding drum being spaced closer longitudinally of the drum than the fingers of the preceding drum, a stationary sieve below said drums through which the shelled peas fall from said drums, a plate under said sieve upon which the peas from the sieve fall, and means for oscillating said sieve.

5. A pea sheller comprising a plurality of rotating drums arranged to receive the peas successively, fingers on each drum, stationary fingers between which pass the fingers on said drums, the fingers on each succeeding drum being spaced closer longitudinally of the drum than the fingers of the preceding drum, and a stationary perforated plate under each drum through which the shelled peas from the drums drop.

6. In a pea sheller, a plurality of rotating drums having their axes in a sloping plane, fingers on the drum, stationary fingers between which the drum fingers pass, a stationary screen under each of the drums through which the peas are forced by the drum fingers and a shaking sieve extending under all of the fingers and adapted to receive both the peas and the hulls.

In testimony whereof I affix my signature.

ARNOLD HEUCKENDORFF.